US008957999B2

(12) United States Patent
Sun (10) Patent No.: US 8,957,999 B2
(45) Date of Patent: Feb. 17, 2015

(54) METHOD OF SELECTIVE APERTURE SHARPENING AND HALO SUPPRESSION USING CHROMA ZONES IN CMOS IMAGERS

(75) Inventor: Yajie Sun, Mountain View, CA (US)

(73) Assignee: Aptina Imaging Corporation, George Town (KY)

( * ) Notice: Subject to any disclaimer, the term of this patent is extended or adjusted under 35 U.S.C. 154(b) by 603 days.

(21) Appl. No.: 13/161,647

(22) Filed: Jun. 16, 2011

(65) Prior Publication Data

US 2012/0274817 A1 Nov. 1, 2012

Related U.S. Application Data

(60) Provisional application No. 61/479,498, filed on Apr. 27, 2011.

(51) Int. Cl.
*H04N 5/208* (2006.01)
(52) U.S. Cl.
CPC ..................................... *H04N 5/208* (2013.01)
USPC ........................................... 348/252; 382/266
(58) Field of Classification Search
USPC .......... 348/234, 241, 251, 252; 382/266, 269, 382/274, 275
See application file for complete search history.

(56) References Cited

U.S. PATENT DOCUMENTS

| 7,251,053 | B1* | 7/2007 | Yoshida ........................ 358/1.9 |
| 7,809,208 | B2 | 10/2010 | Kang |
| 2005/0074181 | A1* | 4/2005 | Hoshuyama .................. 382/266 |
| 2009/0046942 | A1* | 2/2009 | Aiso ............................. 382/266 |
| 2010/0002104 | A1* | 1/2010 | On et al. ....................... 348/252 |
| 2010/0158370 | A1* | 6/2010 | Hoshuyama .................. 382/167 |
| 2011/0090369 | A1* | 4/2011 | Yanagita et al. .............. 348/234 |

* cited by examiner

*Primary Examiner* — Paul Berardesca (57) ABSTRACT

A method of suppressing a dark halo in an imager includes the steps of: extracting an edge value from an image; determining a chroma zone associated with the edge value extracted from the image; and modifying the edge value based on the chroma zone associated with the extracted edge value. The modified edge value from the imager is then provided to a user. The step of determining the chroma zone includes determining a chroma value of Cr and Cb in a Y-Cr-Cb color space; and modifying the edge value includes multiplying the edge value by a predetermined gain value, k, depending on the chroma value of Cr and Cb. If the value of Cr is greater than zero, then the gain value k is set close to zero, in order to suppress the dark halo in the modified edge value. On the other hand, if the value of Cr is less than zero, then the gain value k is set close to one, in order to sharpen the modified edge value in the image.

16 Claims, 9 Drawing Sheets

G-CENTERED

| G (P04) | R (P14) | G (P24) | R (P34) | G (P44) |
| B (P03) | G (P13) | B (P23) | G (P33) | B (P43) |
| G (P02) | R (P12) | G (P22) | R (P32) | G (P42) |
| B (P01) | G (P11) | B (P21) | G (P31) | B (P41) |
| G (P00) | R (P10) | G (P20) | R (P30) | G (P40) |

FIG. 4A

R/B-CENTERED

| R (P04) | G (P14) | R (P24) | G (P34) | R (P44) |
| G (P03) | B (P13) | G (P23) | B (P33) | G (P43) |
| R (P02) | G (P12) | R (P22) | G (P32) | R (P42) |
| G (P01) | B (P11) | G (P21) | B (P31) | G (P41) |
| R (P00) | G (P10) | R (P20) | G (P30) | R (P40) |

METHOD OF SELECTIVE APERTURE SHARPENING AND HALO SUPPRESSION USING CHROMA ZONES IN CMOS IMAGERS

CROSS REFERENCE TO RELATED APPLICATIONS

This application claims priority of U.S. Provisional Patent Application Ser. No. 61/479,498, filed Apr. 27, 2011, which is incorporated herein by reference.

FIELD OF THE INVENTION

The present invention relates, in general, to image processing and, more specifically, to edge sharpening and dark halo suppression in CMOS imagers.

BACKGROUND OF THE INVENTION

Images taken with a digital camera are often blurred due to imperfect focus, camera motion, and in-camera optical and sensor characteristics. As a result, these images are often post-processed to increase sharpness. This accounts for the many commercially available digital image processing software applications that include image sharpening features. In addition, many digital cameras now include in-camera sharpening as part of a post-processing stage before the images are output.

Typically, these sharpening operations involve the use of some form of high-pass filter. Unfortunately, one of the major drawbacks associated with sharpening is its tendency to produce a halo effect (which is sometimes called ringing). The halo effect is characterized by bright regions of the image that are adjacent to dark regions becoming brighter than their surrounding pixels. In addition, dark regions of the image that are adjacent to bright regions get darker than their surrounding pixels.

U.S. Pat. No. 7,809,208, issued Oct. 5, 2010, describes an image sharpening technique with halo suppression. Generally, this technique reduces the haloing effect caused from image sharpening by restricting values to within local minimum and maximum intensities of the unsharpened image. Thus, if the sharpened value is below the local minimum, it is replaced with the local minimum. Similarly, the local maximum is taken, if the sharpened value exceeds the local maximum. This patent is incorporated herein by reference in its entirety.

As will be explained, the present invention provides a method for selective aperture sharpening and dark halo suppression by using chroma zones in CMOS imagers.

BRIEF DESCRIPTION OF THE FIGURES

The present invention may be understood from the following detailed description when read in connection with the accompanying figures.

DETAILED DESCRIPTION OF THE INVENTION

The present invention provides edge sharpening and dark halo suppression by using chroma zones as conditions to selectively sharpen luminance edges and selectively suppress dark halos. The invention, thus, addresses customer complaints about dark halos in the bright color edges. As will be described, the present invention uses sets of chroma zones to set/adjust gains for luminance sharpening and dark halo suppression.

Figure 1:
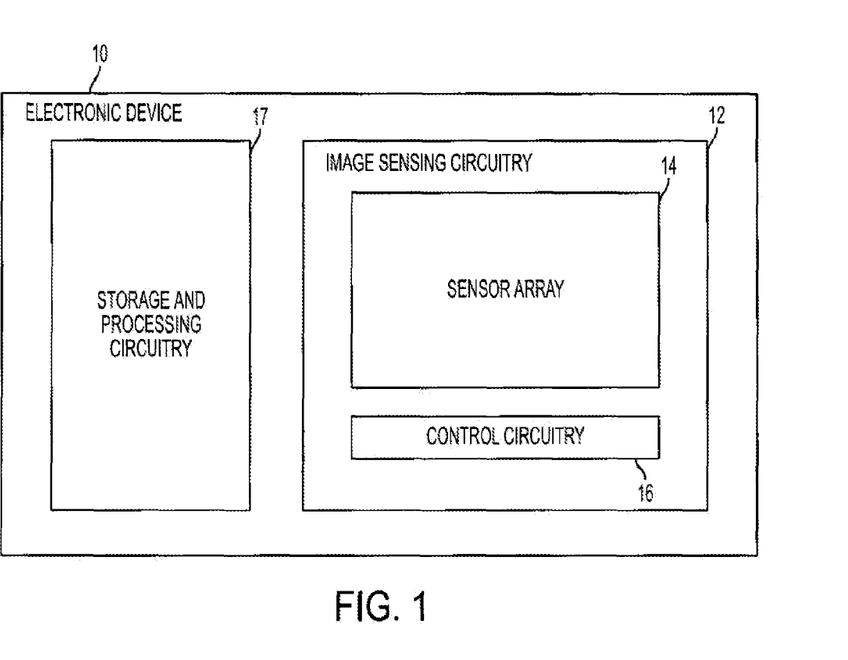
FIG. 1 is an example of a computing environment for the present invention.

An illustrative electronic device that may include edge sharpening, and dark halo suppression is shown in FIG. 1. User device 10 may be any electronic device, such as a cellular telephone, a camera, a desktop computer, a laptop computer, a handheld gaming device, and a hybrid device that combines the functionality of multiple devices.

Device 10 may include image sensing circuitry 12. Image sensing circuitry 12 may include one or more integrated circuits and other components, as desired. For example, image sensing circuitry 12 may include an array of light sensitive pixels, such as sensor array 14. Each of the light sensitive pixels may convert incident light to an electrical signal. As one example, each of the pixels may be formed from a photodetector, such as a photodiode with a light sensitive region and may be configured to produce and store (e.g., accumulate) a charge proportional to the number of photons that impinge upon the light sensitive region. Image sensing circuitry 12 may also include control circuitry 16 that controls the operation of image sensing circuitry 12 and, in particular, that controls the operation of sensor array 14. As examples, control circuitry 16 may be used to reset light sensitive pixels in sensor array 14 (e.g., to remove accumulated image charges from the light sensitive pixels during a reset operation), to read out image data from the light sensitive pixel (e.g., to measure the accumulated charges of the pixels during a readout operation), to transfer accumulated charges to charge storage elements in the pixel array (e.g., to transfer the charge accumulated by each pixel into corresponding storage elements as part of a readout operation, or reset operation), etc. If desired, control circuitry 16 may include one or more analog-to-digital converters that can be used to convert analog signals from sensor array 14 into digital signals for processing.

Storage and processing circuitry 17 may be included in device 10. Storage and processing circuitry 17 may include one or more types of storage, such as hard disk drive storage, nonvolatile memory (e.g., flash memory or other electrically-programmable-read-only memory), volatile memory (e.g., battery-based static or dynamic random-access-memory), etc. Circuitry in storage and processing circuitry 17 may be used to control the operation of device 10 and image sensing circuitry 12. Processing circuitry 17 may be based on a processor such as a microprocessor and other integrated circuits. For example, storage and processing circuitry 17 may be used to run software on device 10, such as image processing applications, image display applications, operating system functions, power management functions, etc. Storage and processing circuitry 17 may be used to store image data such as high dynamic range images captured by sensor array 14 in image sensing circuitry 12. If desired, storage and processing circuitry 17 may be used to store image data during image processing operations.

Sensor array 14 may be formed from a plurality of pixels and may be organized using any architecture. As an example, the pixels of sensor array 14 may be organized in a series of rows and columns.

Figure 2:
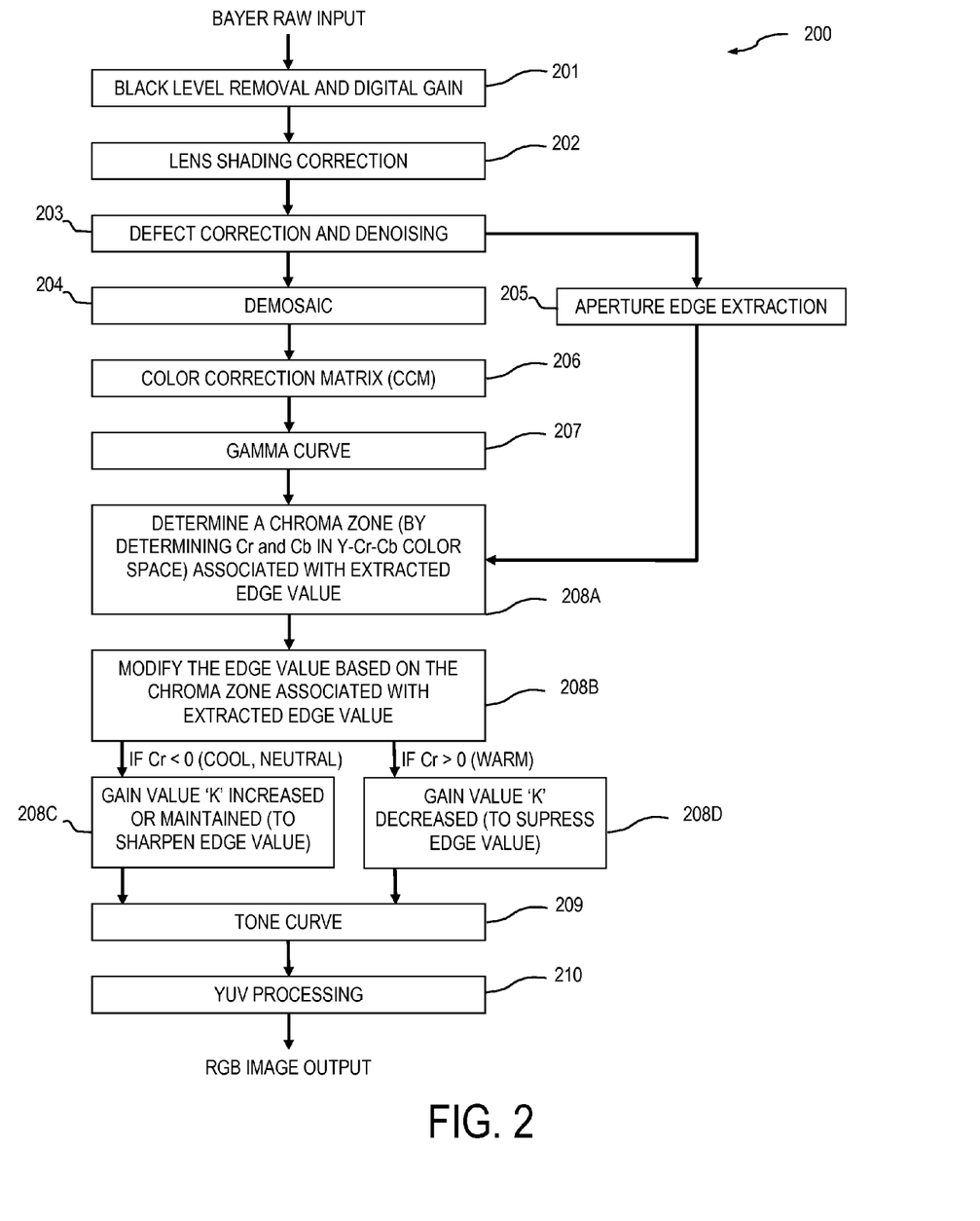
FIG. 2 is a flow diagram of a method that includes steps for aperture edge extraction and aperture edge sharpening, in accordance with an embodiment of the present invention.

Referring next to FIG. 2, there is shown a color pipeline flow diagram, generally designated as 200. Processing steps shown in FIG. 2 may be performed by processing unit 17 of FIG. 1. The pipeline method begins in step 201 by removing dark level intensities in the raw Bayer image. The intensities of the pixels may also be gain corrected. The method next enters step 202 to perform lens shading correction. Any pixel defects may also be corrected and the noise may be reduced by step 203. The raw Bayer image may next be demosaiced by step 204. It will be appreciated that the demosaicing includes a process which interprets missing color channel information for each Bayer pattern pixel inputted into the pipeline processing.

Figure 3:
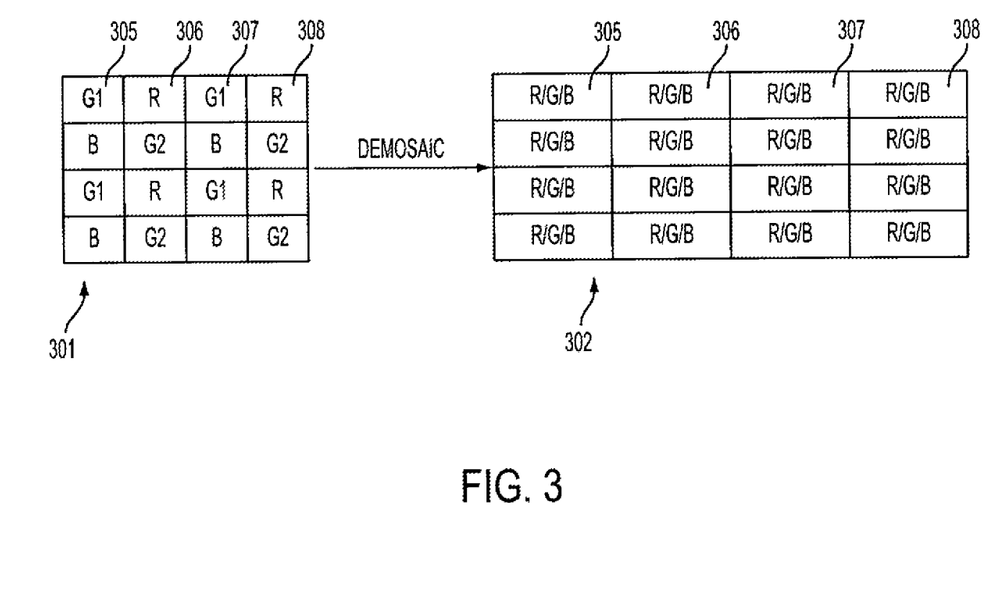
FIG. 3 is a pictorial of an example for demosaicing.

The demosaicing step is shown in detail in FIG. 3. Demosaicing processes the raw Bayer color pattern 301 into an RGB value for each pixel, as shown by pattern 302. Thus, the green pixel 305 in pattern 301 is demosaiced/interpreted into R/G/B colors by obtaining R and B values from the neighboring pixels. Similarly, the red pixel 306 in pattern 301 is converted into R/G/B colors by obtaining G and B values from the neighboring pixels.

A color correction matrix (CCM) may be used by step 206 to correct color information of lighting using the statistics of a captured scene. Gamma correction may be performed next by step 207. It will be appreciated that gamma correction is a non-linear operation used to code or decode luminance values when taking and viewing video or still pictures by various devices.

By way of step 205, the method extracts aperture edges after defect correction and noise reduction. This is described in greater detail below.

The outputs from the gamma correction step 207 and the output from the aperture edge extraction step 205 are provided to the next step 208. Step 208 performs sharpening of the aperture edges by modifying the luminance values of the demosaiced RGB values. This is described in greater detail below. After edge sharpening, the method may modify the contrast using a tone curve in step 209 and may perform YUV processing using step 210.

Two of the steps shown in FIG. 2, namely step 205 in which the aperture edge information is extracted, and step 208, in which the aperture edge is sharpened, will now be described in greater detail.

Figure 4A:
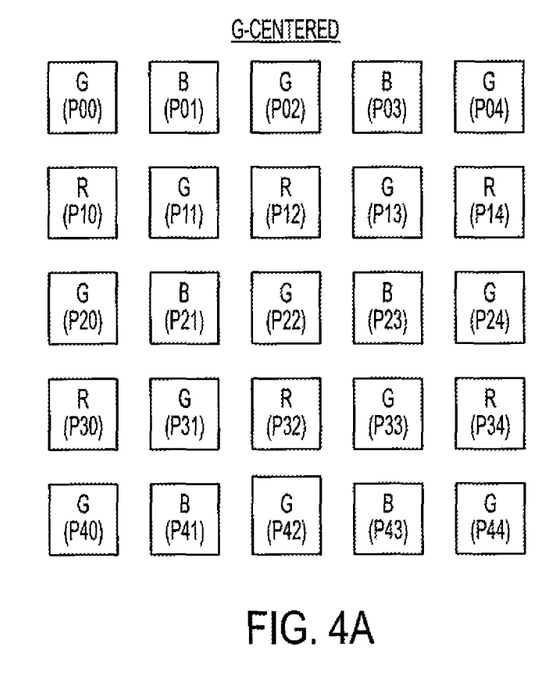
FIGS. 4A and 4B are 5×5 kernels for aperture edge value extraction for a green-centered pixel and a red/blue centered pixel, respectively.
Figure 4B:
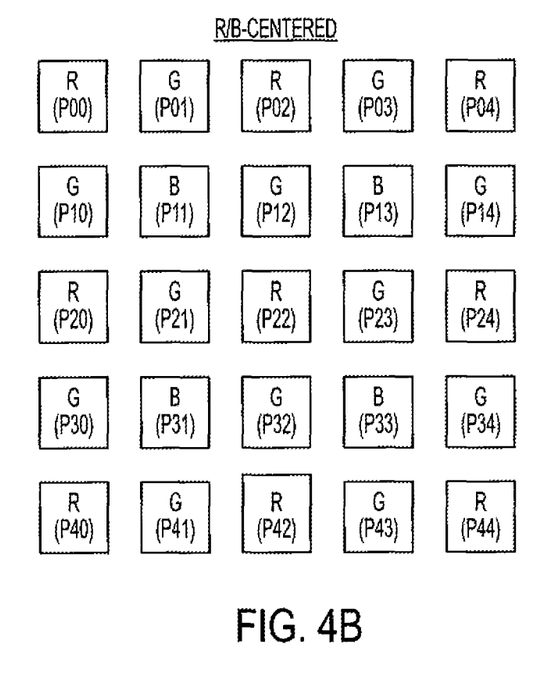

The edge extraction step extracts values from the Bayer raw image using high pass filters. It extracts edge values separately from green, red/blue channels. Generally the red and blue channels are considered equal in this method of edge extraction. A 5×5 kernel, as shown in FIGS. 4A and 4B, is used for extracting the edge information with proper weights. Edge component values are extracted separately on green pixels and non-green pixels. Thus, an edge value for green (E_g) from the green channel, and an edge value for red/blue (E_rb) from the red/blue channel is obtained. The final aperture edge value is obtained using the following expression:

$$APVAL = E\_g * v + E\_rb * (1-v)$$

where
APVAL is the aperture edge value, and
V is a fraction between 0 and 1, usually set as ¾.

The aperture edge correction, steps 208A-D in FIG. 2, will now be described. The aperture correction, also referred to as aperture sharpening is used to sharpen the blurred edge details. The sharpened image has increased contrast and detail, and appears more prominent in the image. Aperture edges may be applied directly to each R, G, and B color channel, or the luminance Y channel. As described below, various conditions are added to the aperture edge value when applied to the color image.

During aperture correction (or edge sharpening), the extracted edge values (positive or negative) are thresholded and scaled. The resulting values are then applied to each color channel R/G/B directly in an additive or a multiplicative way. The resulting values may also be applied to the luma channel Y.

The first step applies threshold and gain to obtain a scaled aperture edge value for each pixel. The threshold is defined as a knee value, or KNEEVAL, for positive and negative aperture values of APVAL. The threshold KNEEVAL is an absolute value. The following relationship may be set up:

If APVAL>0, APVAL=max(APVAL−KNEEVAL,0)
$*gain_p*2^{exp}$

If APVAL<0, APVAL=min(APVAL+KNEEVAL,0)
$*gain_n*2^{exp}$ where $gain_n$, $gain_p$, and exp are scaling parameters to control edge value scaling.

The next step applies the scaled edge value, APVAL, to the demosaiced pixel; either directly to three color channels (R, G, and B), or to the luma channel Y instead.

$$\acute{R} = R + APVAL$$

$$\acute{G} = G + APVAL$$

$$\acute{B} = B + APVAL$$

Or the scaled edge value, APVAL, can be applied to the luma channel Y as:

$$\acute{Y} = Y + coeff * APVAL$$

The present invention provides various approaches to obtaining better edge sharpening results without incurring signal overshoots (halos), as explained below. The present invention selectively increases gain during edge sharpening and selectively suppresses dark halos, using chroma zone information. Color space Y-Cr-Cb is used for defining chroma zones as Y,Cr,Cb could be easily converted and encoded from RGB color values. Cr-Cb provides a way to define chroma zones to condition/control luminance sharpening.

It will be appreciated that aperture correction for image sharpening introduces overshooting/undershooting as aperture edge values are added/multiplied into RGB pixels. This may be desirable for contrast-enhancement in a neutral color area. However, it is a distraction in certain color areas, such as red or pink with a dark or white halo ring. This is because the introduced color difference is too great and, therefore, distracting.

An approach to selectively avoid over-sharpening in certain chroma areas, such as pink, red or skin areas, and to selectively increase gain in neutral gray edges the present invention introduces chroma zone controls into edge sharpening. Chroma information is used as a condition for adding gain controls when sharpening the aperture edges in the RGB images. Edge sharpening is done in the luminance plane, which is orthogonal to the chroma information plane.

Figure 5:
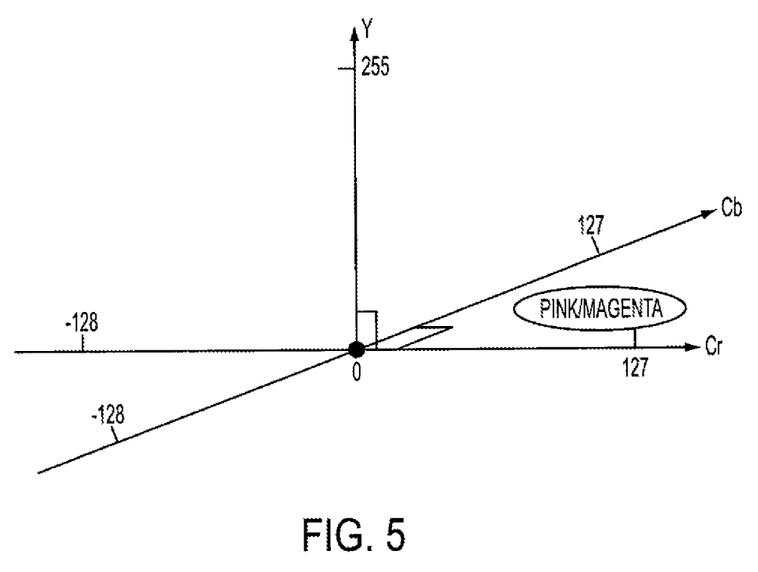
FIG. 5 is a pictorial of a Y-Cr-Cb color space.

This orthogonality may be seen in FIG. 5, which shows the color space Y-Cr-Cb. The luminance Y is orthogonal to the chroma information in the Cr-Cb plane.

Figure 6:
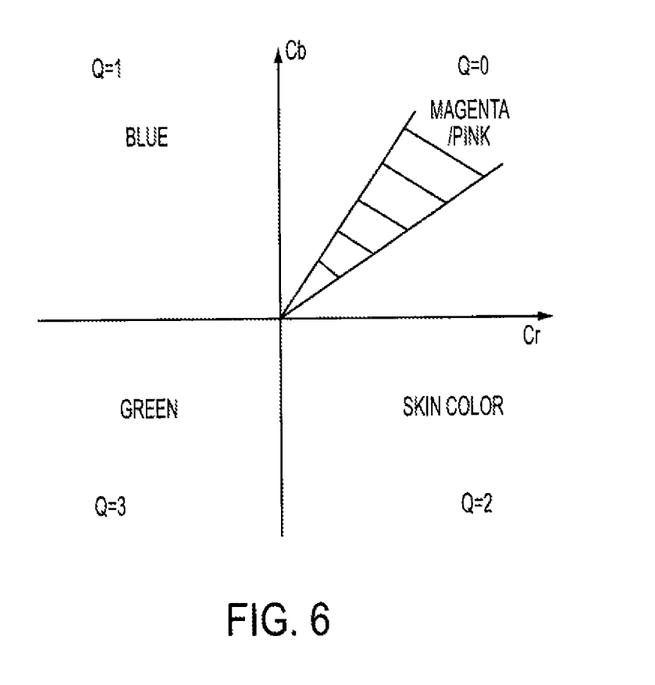
FIG. 6 is a graph of the Cr-Cb plane in the color space of FIG. 5.

The Cr-Cb plane may be seen more easily in FIG. 6. Warm color hues, such as skin tones, pink, magenta, red, and orange, are in the region of Cr>0. Cool color hues, such as cyan, blue, and green, are in the region of Cr<0.

Some typical colors have chroma zones as follows:
Grass (GREEN): Cb<Cr<0 & Cb>10Cr;
Sky (BLUE): Cb<−1/0.4*Cr & Cb>−0.6*Cr;
Skin: Cb<−0.1*Cr & Cb>−1/0.8*Cr & R<1.75*G;
Others: 1−(Grass|Sky|Skin).

For chroma-based halo suppression and selective sharpening, the present invention sets a constraint on certain chroma areas, and then reduces or increases aperture edge sharpening in those chroma areas. Some examples are as follows:

In one example, the method sets the whole region of Cr>0 as the region (or zone) in which the present invention desires to prevent any halo distraction. This may be accomplished with the following expression:

if($C_r$>0)APVAL=APVAL*$k$;

where
$k$ is gain and $k \in [0,1)$;
$k$ may be set to 0 or close to 0; and
APVAL is the extracted aperture edge value for the sharpening.

In another example, the method of the invention focuses on pink, red and orange chroma regions by adding the following constraint when applying aperture edge values for sharpening:

if(($C_r$>0)&&(abs($C_r$)*8>abs($C_b$)*13))

APVAL=APVAL*$k$;

where
$k$ is gain and $k \in [0,1)$;
$k$ may be set to 0 or close to 0; and
APVAL is the extracted aperture edge value for the sharpening If $k$ is set to near zero, the present invention suppresses the dark halo appearance for bright color edges, such as in red flower petals.

Similar constraints may be imposed on other chroma regions, such as green or blue hues. It is more effective, however, to concentrate on warm halo protection.

Yet another example is provided by the method focusing on neutral gray zones by setting the following constraint:

(($Cr$<0)&&(max(abs($Cr$),abs($Cb$))+0.5*min(abs($Cr$), abs($Cb$))<δ));

APVAL=APVAL*$k$.

where $k \in [1,2)$

If $k$ is set to a large value, the present invention adds over-sharpening to neutral edges, in order to produce sharper edges and better contrast.

Figure 7:
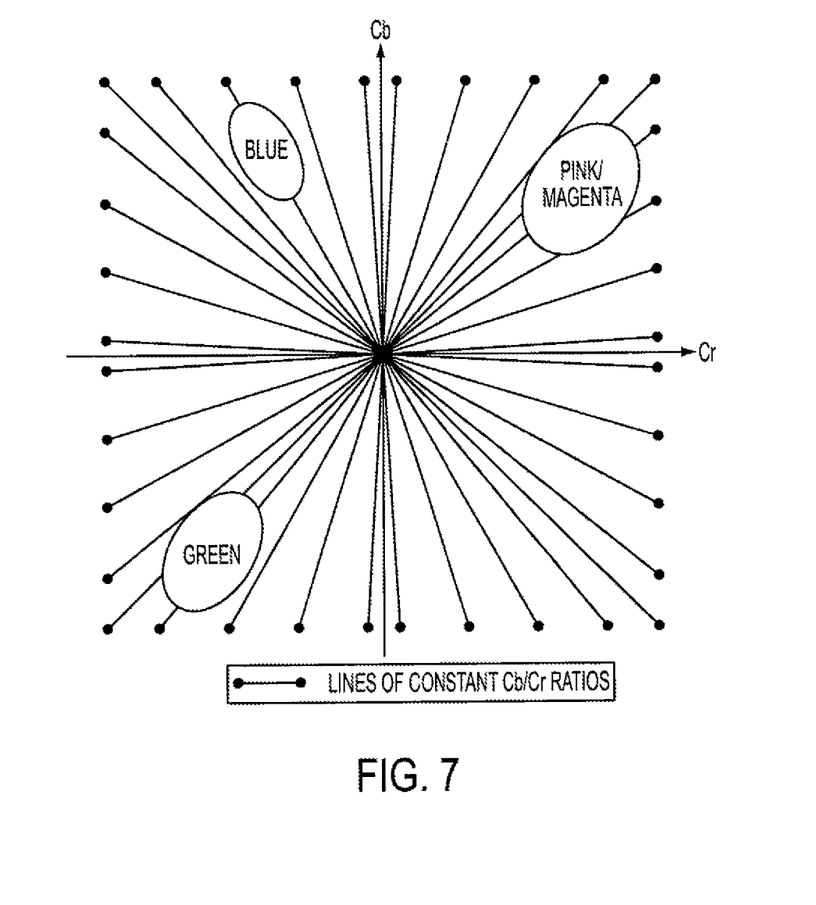
FIG. 7 is a graph of lines of constant Cb/Cr ratios plotted in the Cr-Cb plane of FIG. 5, providing 36 chroma zones, in accordance with an embodiment of the present invention.

In still another example, the method of the present invention divides the chroma plane into 36 regions separated by abs(Cr/Cb) ratios as used in a preferred color reproduction (PCR) block in the color pipeline. FIG. 7 shows how Cr-Cb is divided into 36 regions. A different gain is set for each region, in order to utilize the whole chroma plane for selectively controlling edge sharpening for different color chroma/hues.

Figure 8:
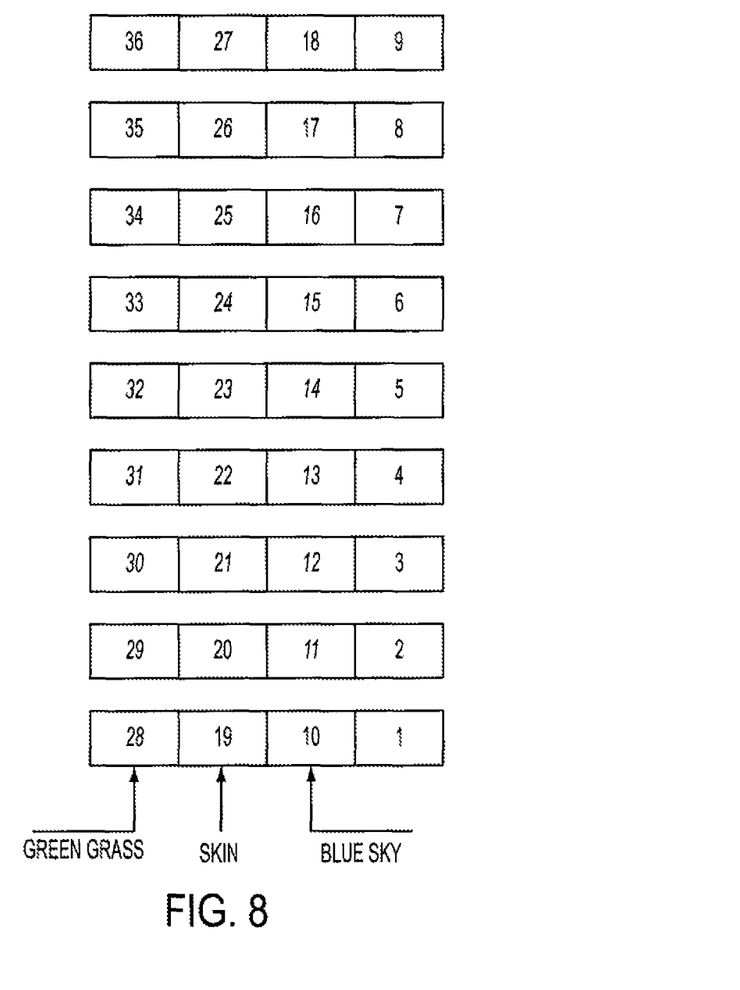
FIG. 8 is an example of nine registers containing 36 4-bit values representing gains for the corresponding 36 sectors in the Cr-Cb plane of FIG. 7, in accordance with an embodiment of the present invention.

A register (or part of a register) may be used to store gains for the chroma regions, as a PCR control register or another designated register. FIG. 8 shows the gain setup used to condition each chroma zone when applied to aperture edge values. The gain settings may be hard-coded and pre-stored. They may also be tunable and calibrated according to different imaging scenes.

FIG. 8 illustrates nine registers and their associated 4-bit gain values. The details of register positions for green grass, blue sky and skin are also shown.

The chroma-based selective edge sharpening and suppression may also be used to add special effects on the edges, such as a pseudo color overlay for delineating the boundary for color object detection/tracking.

In still another example, in order to limit the dark and white halos in neutral chroma regions, the present invention may apply limits relative to the luma strength so that over-sharpening is clamped. This may be done as follows:

For a positive aperture edge value, APVAL is positive. The luma value is defined as Y. Thus, the following expression is used:

If(APVAL>$Y$*$k_p$),then $Y=Y$*$(1+k_p)$;

else $Y=Y$+APVAL;

where APVAL>0, and $k_p \in [0,1)$.

Similarly, for a negative aperture edge value, APVAL is negative. The luma value, Y, may be expressed as follows:

if(APVAL+$Y$*$k_n$<0),then $Y=Y$*$(1-k_n)$ else $Y=Y$+APVAL;

where APVAL<0, and $k_n \in [0,1)$

If $k_p$ and $k_n$ are set small enough, white and dark halo appearances may be avoided, with edge sharpening and contrast enhancement.

Figure 9:
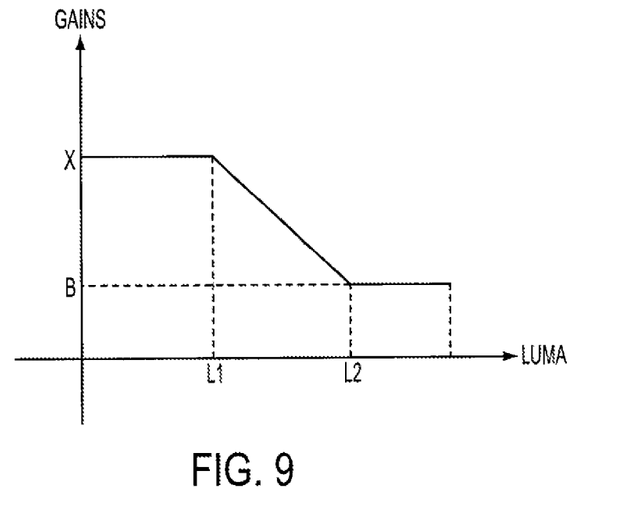
FIG. 9 is a plot of gain versus luma, in accordance with an embodiment of the present invention.

Another example boosts the edges in relative dark areas by applying a little more gain and suppress the halos in bright areas by applying a little less gain. FIG. 9 shows a gain profile versus luma, which monotonically decreases so that the contrast in the dark area may be boosted and the potential halo may be suppressed in the bright area.

As shown, the luma values L1 and L2 may be predetermined, or tunable parameters/registers. The base gain B may be a gain parameter; the $gain_p$ or $gain_n$, and X may depend on the analog gain.

In the following equation, Y is the luma value of the current pixel under consideration. The following adaptive gains for a positive aperture may be set to selectively adjust the sharpening:

$$gain_p(\text{final}) = \begin{cases} gain_p, & Y > L_2 \\ gain_p + \frac{L_2 - Y}{L_2 - L_1} * \frac{X}{ANAGAIN}, & L_1 < Y < L_2 \\ gain_p + \frac{X}{ANAGAIN}, & Y < L_1 \end{cases}$$

where ANAGAIN is the analog gain of the current image, and

X is a predetermined parameter or be a tunable parameter characterized for the sensor or application.

Similarly, the gain profile for a negative aperture edge may be expressed as follows:

$$gain_n(\text{final}) = \begin{cases} gain_n, & Y > L_2 \\ gain_n + \dfrac{L_2 - Y}{L_2 - L_1} * \dfrac{\overline{X}}{ANAGAIN}, & L_1 < Y < L_2 \\ gain_n + \dfrac{\overline{X}}{ANAGAIN}, & Y < L_1 \end{cases}$$

where ANAGAIN is the analog gain of the image capture, and $\overline{X}$ is a predetermined parameter or a tunable parameter.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of suppressing a dark halo in an imager using processing circuitry, comprising the steps of:
    using a high pass filter, extracting an edge value from an image;
    with the processing circuitry, determining a chroma zone associated with the edge value extracted from the image;
    modifying the edge value based on the chroma zone associated with the extracted edge value;
    demosaicing the image; and
    applying the modified edge value to the demosaiced image, wherein determining the chroma zone includes determining a chroma value of Cr and Cb in a Y-Cr-Cb color space, and modifying the edge value includes multiplying the edge value by a predetermined gain value, k, depending on the chroma value of Cr, wherein if the value of Cr is less than zero, then the gain value k is set to a value that is greater than one, in order to sharpen the modified edge value in the image.

2. The method of claim 1 wherein if the value of Cr is greater than zero, then the gain value k is set to a value that is at least zero and less than one, in order to suppress the dark halo in the modified edge value.

3. The method of claim 1 wherein if the value of Cr is greater than zero, then the gain value k is set to a value that is at least zero and less than one, in order to suppress the dark halo in the modified edge value having pink, magenta, red, or orange chroma regions.

4. A method of suppressing a dark halo in an imager using processing circuitry, comprising the steps of:
    using a high pass filter, extracting an edge value from an image;
    with the processing circuitry, determining a chroma zone associated with the edge value extracted from the image;
    modifying the edge value based on the chroma zone associated with the extracted edge value;
    demosaicing the image; and
    applying the modified edge value to the demosaiced image, wherein determining the chroma zone includes determining a chroma value of Cr and Cb in a Y-Cr-Cb color space, and modifying the edge value includes multiplying the edge value by a predetermined gain value, k, depending on the chroma value of Cr, wherein if the value of Cr is less than zero, then the gain value k is set to a value that is at least one and less than two, in order to sharpen the modified edge value in the image.

5. The method of claim 4 wherein the image has cyan, blue or green chroma regions.

6. The method of claim 1 wherein extracting the edge value from an image includes determining an intensity value of Y in a Y-Cr-Cb color space, wherein determining the chroma zone includes determining a chroma value of Cr and Cb in the Y-Cr-Cb color space, and wherein modifying the edge value includes modifying the intensity value of Y based on the Cr and Cb values in the Y-Cr-Cb color space.

7. The method of claim 6 wherein the edge value is suppressed for warm hues in the Y-Cr-Cb color space, and the edge value is sharpened for cold hues in the Y-Cr-Cb color space.

8. The method of claim 6 wherein the edge value is sharpened or suppressed based on a chroma region associated with the intensity value of Y, and the chroma region is one region in multiple chroma regions of a Cr-Cb plane in the Y-Cr-Cb color space.

9. The method of claim 1 including the step of:
    with the processing circuitry, gamma correcting the demosaiced image, wherein the demosaicing and gamma correcting steps are performed on a Bayer image, prior to modifying the edge value based on the chroma zone.

10. A machine-implemented process for suppressing a halo caused by sharpening an image captured with a digital camera using processing circuitry, the machine-implemented process performing the following steps:
    using a high pass filter, extracting an edge value from a raw Bayer color pattern;
    with the processing circuitry, determining a gain of the extracted edge value;
    locating the extracted edge value, as a Y value, in a Y-Cr-Cb color space;
    locating a chroma zone corresponding to the Y value in a Cr-Cb plane of the Y-Cr-Cb color space; and
    modifying the gain of the extracted edge value based on the located chroma zone, wherein if the chroma zone is located in cool color hues, including cyan, blue and green, then modifying the gain of the extracted edge value includes increasing the gain of the extracted edge value.

11. The process of claim 10 wherein if the chroma zone is located in warm color hues, including pink, red and orange, then modifying the gain of the extracted edge value includes reducing the gain of the extracted edge value.

12. A machine-implemented process for suppressing a halo caused by sharpening an image captured with a digital camera using processing circuitry, the machine-implemented process performing the following steps:
    with the processing circuitry, identifying an intensity value of each pixel in a prescribed group of pixels;
    calculating a luminance value of a current pixel using nearest neighbor calculations in the prescribed group of pixels;
    locating a chroma zone in a Y-Cr-Cb color space corresponding to the luminance value of the current pixel; and
    modifying the luminance value of the current pixel based on the located chroma zone, wherein if the chroma zone is located in a region having a Cr value greater than zero, then modifying the luminance value of the current pixel includes reducing the luminance value.

13. The process of claim 12 wherein if the chroma zone is located in a region having a Cr value less than zero, then modifying the luminance value of the current pixel includes increasing the luminance value.

14. The process of claim 12 wherein the luminance value of the current pixel is orthogonal to the chroma zone in the Y-Cr-Cb color space.

15. The process of claim 12 wherein the luminance value of the current pixel is modified based on color hues in the Y-Cr-Cb color space.

16. The method of claim 1 wherein the edge value is negative.

* * * * *